United States Patent [19]

Nix, nee Saxler

[11] 3,968,907

[45] July 13, 1976

[54] DISPENSER FOR DISPENSING METERED QUANTITIES OF LIQUID FROM A CONTAINER

[75] Inventor: Maria Nix, nee Saxler, Cologne, Germany

[73] Assignee: Norbert Nix, Cologne, Germany

[22] Filed: Apr. 9, 1974

[21] Appl. No.: 459,356

[30] Foreign Application Priority Data

Apr. 11, 1973 Germany............................ 2318120

[52] U.S. Cl................................ 222/416; 222/454
[51] Int. Cl.² ....................................... G01F 11/26
[58] Field of Search ........... 222/416, 442, 454, 456, 222/464, 564, 204; 73/226

[56] References Cited
UNITED STATES PATENTS

| 1,888,239 | 11/1932 | Mosby ............................ | 222/416 X |
| 1,901,785 | 3/1933 | Swindin ............................ | 222/416 X |
| 2,209,947 | 8/1940 | Conrade et al. ................. | 222/416 X |
| 2,606,690 | 8/1952 | Hansen ............................ | 222/204 X |
| 2,728,490 | 12/1955 | Scannell et al. ................. | 222/416 X |
| 3,193,160 | 7/1965 | Veit et al. ........................ | 222/416 X |

FOREIGN PATENTS OR APPLICATIONS 580,288 9/1946 United Kingdom................. 222/416

Primary Examiner—Stanley H. Tollberg
Assistant Examiner—Charles A. Marmor
Attorney, Agent, or Firm—Michael J. Striker

[57] ABSTRACT

A housing forms a chamber having a bottom wall, and a discharge tube communicates with the chamber in the region of the bottom wall, being upwardly inclined exteriorly of the housing and having a free end insertable into a dispensing opening of a container. A dispensing tube extends from the interior of the chamber through the bottom wall to the exterior of the housing, and an arrangement is provided for dispensing via the dispensing tube metered quantities of liquid which enter the chamber from the container through the discharge tube.

4 Claims, 3 Drawing Figures

DISPENSER FOR DISPENSING METERED QUANTITIES OF LIQUID FROM A CONTAINER

BACKGROUND OF THE INVENTION

The present invention relates generally to a dispenser, and in particular to a dispenser for dispensing metered quantities of liquid from a container.

There are many instances where it is desired to dispense from a container, for instance a bottle or the like, metered quantities of liquid. By way of example, which will hereafter be used to explain the invention but should not be considered limiting, reference is made to the dispensing of alcoholic beverages from bottles. There, it is often desirable and, in the case of commercial establishments, important that the alcoholic beverage be dispensed from a bottle in uniform metered amounts. To aid in dispensing such uniform amounts, it is already known to provide dispensing devices which are mounted on the bottle (or other container) so that, when the bottle is tilted, liquid from the bottle flows into the dispensing device to be dispensed from the same in a metered quantity.

In particular, the prior art knows a device having a housing provided with a dispensing tube which is located within the chamber formed in the housing but has an outer outlet end, and which is surrounded with spacing within the chamber by an outer tube. The liquid which enters the chamber from the bottle rises in the clearance between the outer tube and the dispensing tube until it reaches the upper open end of the dispensing tube and flows into the latter. During this rising of the liquid, a corresponding quantity of air is drawn via an air tube communicating with the chamber and with the interior of the bottle, into the latter due to the suction which develops in the bottle as liquid is poured out of it. After the liquid has risen to the upper open end of the dispensing tube, it pours into the latter and this interrupts the further entry of air via the air tube into the bottle. The outflow of liquid through the dispensing tube continues until the liquid level in the chamber has reached the lower end of the outer tube, so that now air can again be drawn from the chamber through the clearance into the air tube, which causes the flow of liquid to be interrupted. If at this time the bottle is not righted, but instead continues to be maintained at a pouring angle, then air will again enter into the bottle via the air tube and the chamber of the housing of the dispensing device will again fill with liquid which becomes dispensed.

This prior art arrangement has the advantage that the amount of liquid being discharged is automatically metered and that no levers or other mechanical devices such as valves or the like are required to effect such metering. Such devices are susceptible to malfunction, for instance if the liquid being dispensed happens to be viscous or tacky, as might be the case if a liqueur is dispensed, because this leads to sticking of the mechanical devices and their malfunction. However, the aforementioned prior-art arrangement has a disadvantage which makes it less than completely satisfactory. Specifically, the prior-art device can be used only with dispensing tubes of small internal cross section. The reason for this is that it is of primary importance that the amount of liquid entering the dispensing tube should completely fill the cross section of the latter, if an accurately metered quantity of liquid is to be dispensed. However, such complete filling of the cross section of the dispensing tube is possible in the prior-art device only if the cross section is small, because otherwise the liquid entering the dispensing tube tends to cling to the inner surface of the tube and leaves the remaining portion of the tube cross section empty, which then interferes with proper metering of the dispensed liquid.

SUMMARY OF THE INVENTION

Accordingly, it is a general object of the invention to overcome the disadvantages of the prior art.

More particularly, it is an object of the present invention to provide an improved dispenser for dispensing metered quantities of liquid from a container.

In keeping with the above objects, and with others which will become apparent hereafter, one feature of the invention resides in a dispenser for dispensing metered quantities of liquid from a container which, briefly stated, comprises a housing forming a chamber having a bottom wall, a discharge tube communicating with this chamber in the region of the bottom wall and being upwardly inclined. The discharge tube has a free end which is insertable into a dispensing opening of a container. A dispensing tube extends from the interior of the chamber through the bottom wall, and means is provided for dispensing metered quantities of liquid via the dispensing tube, which liquid enters the chamber from the container through the discharge tube.

According to one concept of the invention, the device can have an air tube which communicates directly or indirectly with the upper end portion of an outer tube which surrounds the dispensing tube. An insert is located in the upper end portion of the outer tube above the upper open end of the dispensing tube and has an underside facing this upper open end and so configurated that it will guide any liquid which rises in the clearance between the dispensing tube and the outer tube and overflows over the upper open end of the dispensing tube, in such a manner into the latter that it will fill the cross section of the dispensing tube. The insert is provided with passages through which air which is drawn into this clearance can enter the air tube.

The insert may separate the space between the closed upper end of the outer tube and the open upper end portion of the dispensing tube into an upper air compartment with which the air tube directly communicates, and a lower liquid compartment into which the underside of the insert faces, this underside being provided with a surface which constitutes a guide face for the liquid. The insert may have a disc-shaped portion which completely fills the cross section of the outer tube, and from the underside there may extend a projection into the upper open end of the dispensing tube, which projection merges into the disc-shaped portion via an annular surface that is inwardly concave and constitutes the guide face. The disc portion may be provided with passages or openings which connect the two compartments with one another.

With this construction just described, the liquid will enter into the upper open end of the dispensing tube while being guided by the guide face, and will not be permitted to flow only along the inner surface of the dispensing tube but will completely fill the cross section of the dispensing tube. This assures that even if the dispensing tube has a cross section which is significantly larger than the maximum cross section that could be used in the aforementioned prior-art construction, it will be immediately filled with liquid over its entire cross section and metered dispensing of liquid will be assured.

The air passages permit the air which is displaced during the upward rising of the liquid, to pass into the air compartment and from there to the air tube through which it travels into the container.

According to another concept of the invention, it is possible to measure and meter not the liquid which enters the chamber of the housing, but the air which flows into the container, so that the liquid is thereby indirectly metered. In this construction, a device is provided which measures the amount of air that flows into the bottle and meters it, to assure that a corresponding amount of liquid —which is always uniform during successive dispensing operations—can flow from the bottle into the chamber to the housing. In this construction, a bellows member may be accommodated in the housing, being interposed between the air tube and the dispensing tube and having a bottom wall provided with an upwardly extending projection, whereas downwardly of its top wall the bellows member is provided in its interior with a leaf spring. The leaf spring normally engages an outlet end of an air-admitting tube communicating with the exterior of the housing and the interior of the bellows member below the leaf spring, and can be flexed upwardly to engage and close an inlet end of the air tube which also communicates with the interior of the bellows member but above the leaf spring. When air is vented from the bellows member into the bottle, the bellows member contracts and the projection on the upwardly moving bottom wall eventually engages the leaf spring and flexes the same into engagement with the inlet opening of the air tube, so that no further air flow can take place into the bottle, whereas air can now enter through the air-admitting tube into the bellows member, resulting in a downward movement of the bottom wall thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
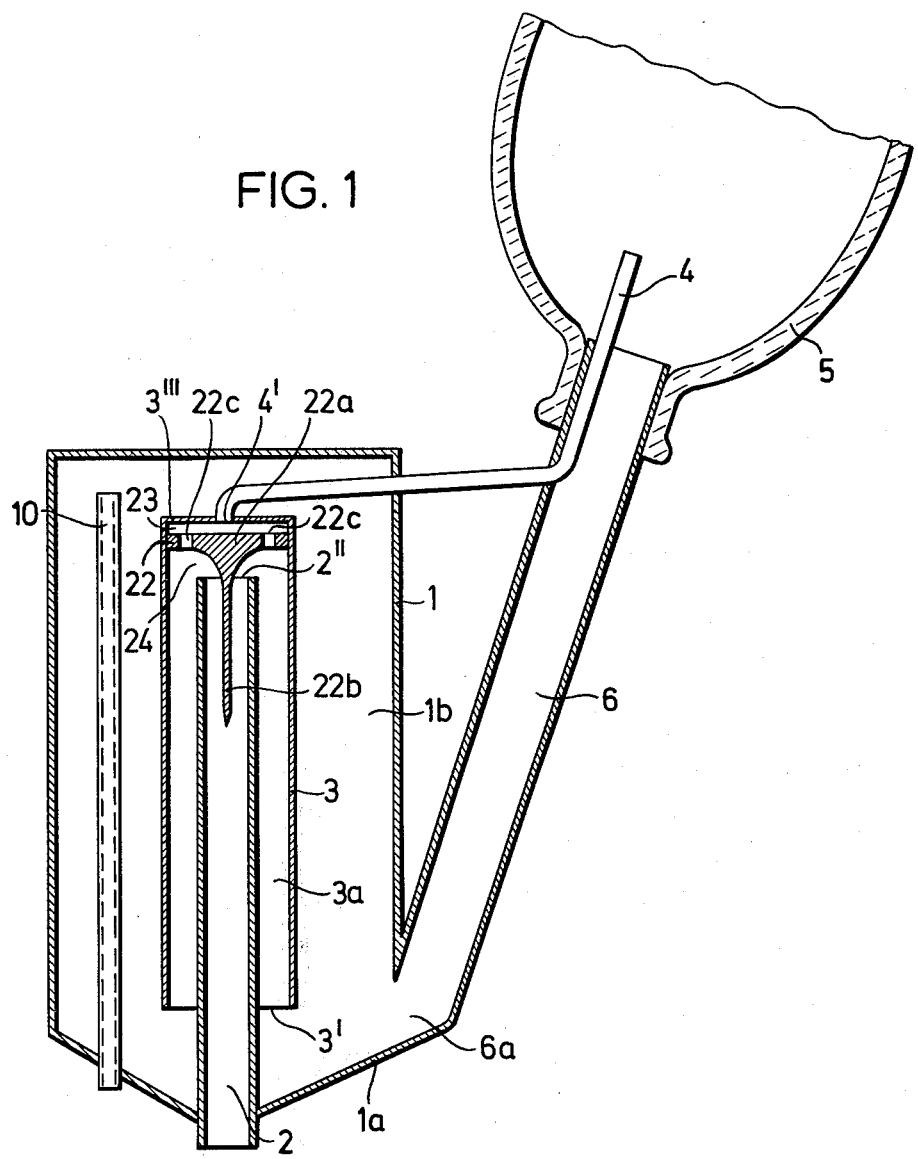
FIG. 1 is a diagrammatic section through one embodiment of the invention.

Before discussing the drawing in detail, it is pointed out that in all three FIGS. the dispenser according to the present invention is shown in dispensing position, that is in a position in which it is operative for dispensing liquid in a metered quantity. A portion of the container from which liquid is to be dispensed, shown by way of example as a bottle, is illustrated only in FIG. 1; it should be understood to be connected in a similar manner in the embodiments of FIGS. 2 and 3.

Referring now firstly to the embodiment in FIG. 1 it will be seen that reference numeral 1 identifies a housing of the novel dispenser, which housing has an interior chamber 1b serving as the metering chamber. Upwardly of a bottom wall 1a of the housing 1, but in the region of this bottom wall 1a, a discharge tube 6 communicates with the chamber 1b. This discharge tube 6 has an upper open end which is insertable into the discharge opening of a container, that is here into the neck of the fragmentarily illustrated bottle 5.

Centrally located in the chamber 1b is a dispensing tube 2 which extends through the bottom wall 1a and has a lower open end from which liquid is to be dispensed. An outer tube 3 surrounds the tube 2 with clearance and has an upper closed end 3''' which is upwardly spaced from the upper open end 2'' of the tube 2. The lower open end 3' of the outer tube 3 is upwardly spaced from the bottom wall 1a. The tube 3 includes with the tube 2 an annular clearance 3a which continues upwardly of the upper open end 2'' of the tube 2. An air tube 4 communicates with the tube 6 and thus with the interior of the bottle 5, and has an inner end which communicates via the closed upper end 3''' of the tube 3 with the clearance 3a. A vent tube 10 is also located in the chamber 1b and communicates with the exterior of the housing 1 through the bottom wall 1a.

The space between the upper closed end 3''' and the upper open end 2'' is subdivided into an upper air compartment 23 and a lower liquid compartment 24 by the presence of an insert 22. The insert 22 has a disc-shaped portion 22a the outer diameter of which corresponds to the inner diameter of the tube 3 in which it is received. The underside of the portion 22a is formed with a downward projection 22b which centrally extends into the tube 2. It should be noted that the portion 22b merges with the portion 22a via an annular or circumferential surface which is inwardly concave, as illustrated. The portion 22a is provided with air openings 22c, for instances four angularly spaced ones thereof, although there can, of course, be fewer or more of them; the openings 22c communicate the compartments 23 and 24 with one another.

The basic principle of operation of the dispenser in FIG. 1 is the same as that which has been described in the description of the prior art. In other words, liquid flows from the bottle 5 via the tube 6 into the chamber 1b, and rises in the clearance 3a while at the same time displacing air from the clearance via the tube 4 into the bottle 5. However, unlike the prior-art construction, the liquid, on reaching the upper open end 2'' of the tube 2, and thereupon flowing into the interior of the tube 2, encounters the insert 22 which so guides it that it will immediately on entry fill the entire cross section of the tube 2, thus assuring that the metering of the discharged liquid is precise and never varies from one time to the next.

If a residual quantity of liquid should be contained in the bottle 5, which is smaller than the metered amount to be dispensed, then no further dispensing can take place because no further quantity of liquid can enter into the clearance 3a.

The level difference between the lower end 3''' and the upper end 2'' determines the amount of liquid which is being dispensed during each operation. It is important that the liquid enter the chamber 1b at a low level, that is in the region 6a. Because the tube 4 will be completely filled with liquid during the dispensing operation due to the suction which develops in the bottle 5 as liquid flows out from the same, which suction causes first air to be withdrawn from the clearance 3 into the bottle 5 and subsequently liquid to enter into the tube 4, it is clear that the tube 4 must have the liquid withdrawn from it before additional liquid can flow from the bottle 5 into the chamber 1b for a next successive dispensing operation. For this purpose, the liquid from the bottle 5 is made to enter the chamber 1b at the level of the opening 6a, whereas in the tube 4 the liquid will rise only to the level 4'. The underpressure resulting from the difference between these two levels causes the liquid to be drawn through the tube 4 into the bottle 5 so that subsequently air can again flow through the tube 4.

Figure 2:
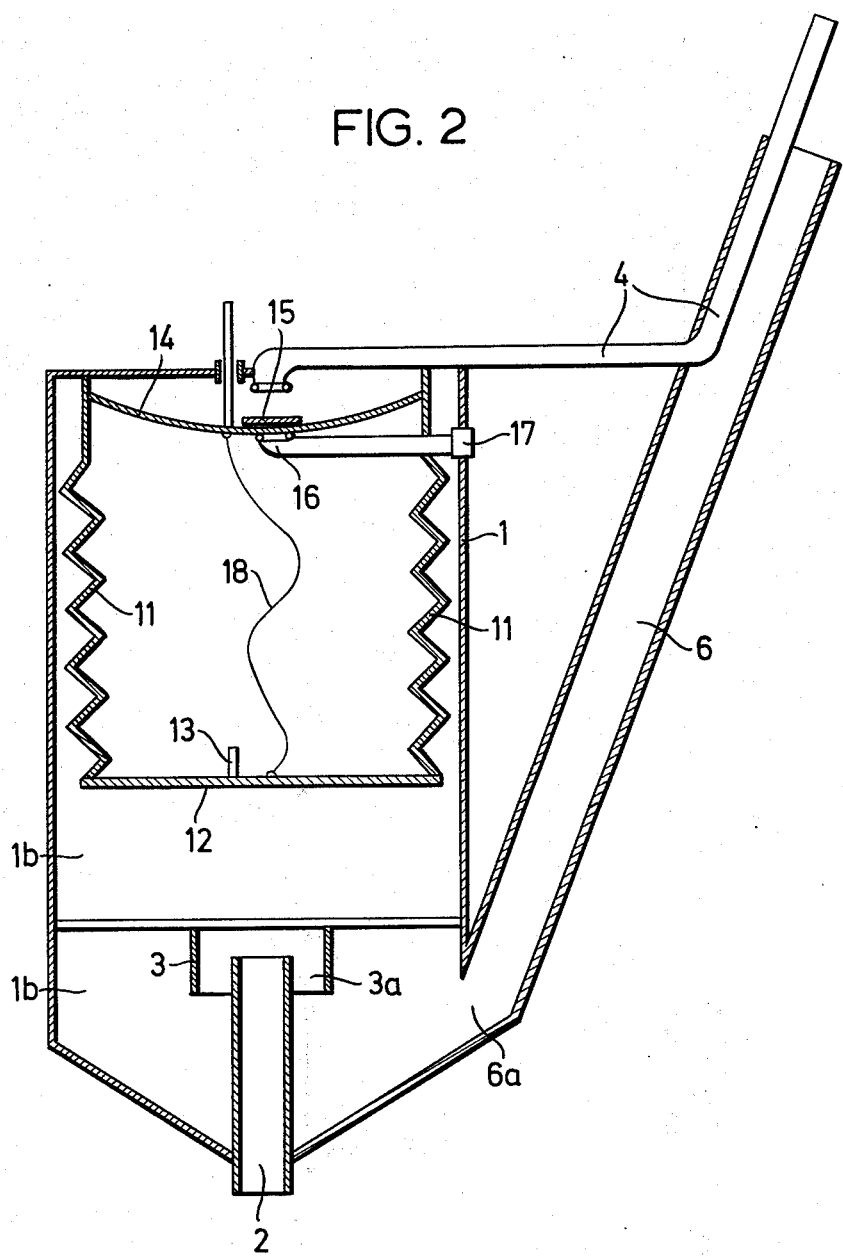
FIG. 2 is a view similar to FIG. 1, but illustrating a further embodiment of the invention.

The embodiment of FIg. 2 is different from that of FIG. 1 in that it shows metering of the amount of air that can flow into the bottle 5, which thus provides indirect metering of the amount of liquid being dispensed. In this embodiment, like reference numerals identify like components as before. Here, however, a bellows member 11 is mounted in the chamber 1b, having a bottom wall 12 from which a projection 13 extends upwardly towards the closed upper open end of the bellows member, which upper open end is closed by a portion of the housing 1 in this embodiment. Downwardly of the upper end of the bellows member 11 a leaf spring 14 extends across the latter, being mounted so that it normally is bowed downwardly as illustrated. A valve member 15 is mounted on the upper side of the leaf spring 14. The air tube 4 has an inlet opening which communicates with the bellows member above the valve member 15, and an air supply tube 16 has an inlet 17 exteriorly of the housing 1 and an outlet which is located beneath the leaf spring 14.

When air can flow via the tube 4 into the bottle 5 (which is not shown in this FIG.), then liquid can flow from the bottle 5 through the tube 6 and the inlet 6a into the chamber 1b, and from there through the clearance 3a into the tube 2 from which it is dispensed. The underpressure which develops in the bottle 5 as a result of the outflow of liquid causes via the tube 4 a withdrawal of air from the bellows member 11. This, in turn, causes the bellows member 11 to contract so that the bottom wall 12 moves upwardly until the projection 13 engages the leaf spring 14 and flexes it upwardly to the extent that the valve member 15 engages and closes the inlet opening of the air tube 4. This terminates the outflow of liquid via the tube 2. At the same time, the outlet opening of the air-admitting tube 16 has been opened by the upward flexing of the leaf spring 14, so that air can now flow from the exterior of the housing 1 into the interior of the bellows member 11, causing the latter to return to its extended position shown in FIG. 2 unless the bottle and thereby the dispenser have been moved to upright position. As the bottom wall 12 moves downwardly to the position illustrated in FIG. 2, it tightens the elongated flexible element 18, for instance a filament or thread, which is connected both to the bottom wall 12 and the leaf spring 14. The leaf spring, which at this time is in an upwardly bowed position, is now flexed downwardly to the position illustrated in FIG. 2, opening the inlet end of the air tube 4 and closing the outlet end of the air-admitting tube 16. This means that air can now enter again into the bottle 5 via the air tube 4, and the next dispensing operation can begin.

Figure 3:
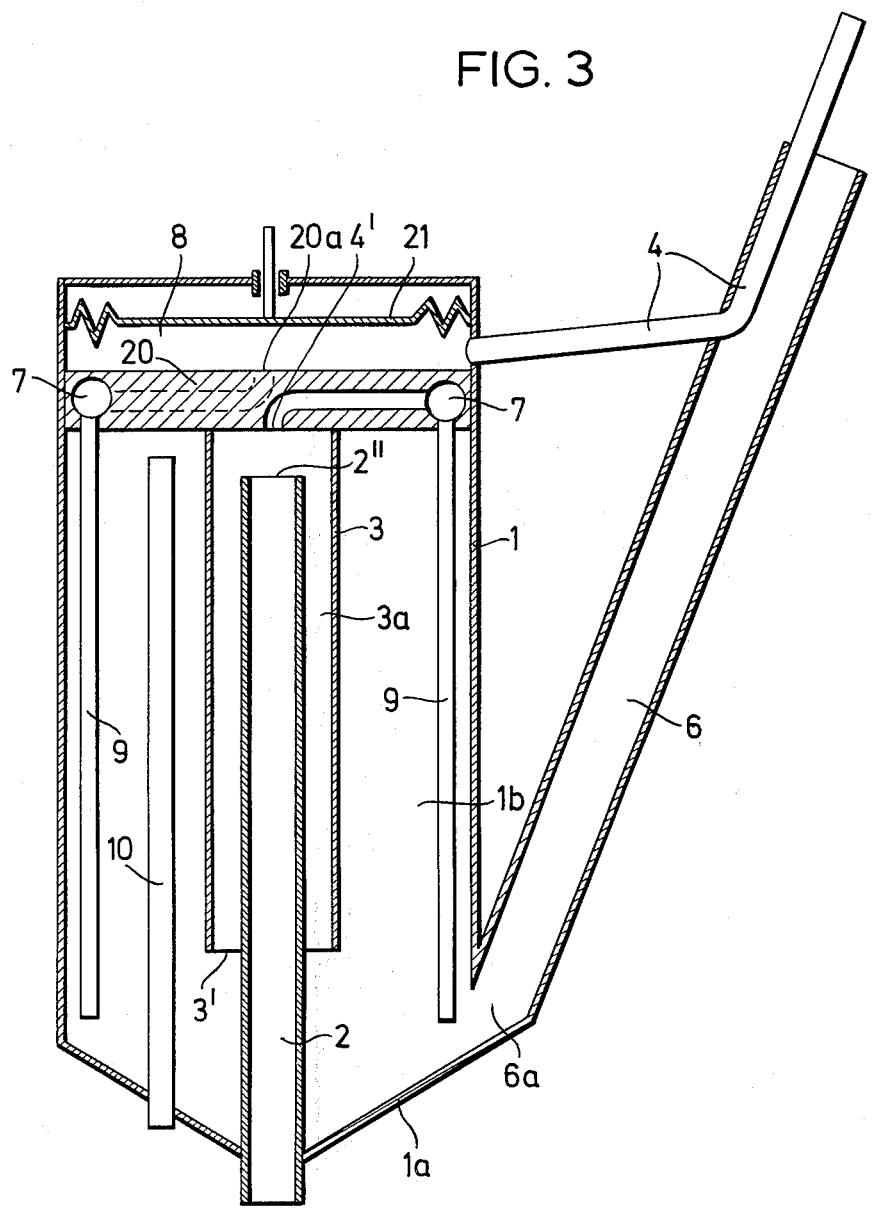
FIG. 3 is a view similar to FIG. 1, illustrating an additional embodiment of the invention.

The embodiment in FIG. 3 is analogous to that of FIG. 1, but shows means for blocking the outflow when the bottle is inclined. Such means are needed because a precise metering can be obtained only if the dispensing device is actually in vertical position, not in a position in which it is less inclined than in a vertical position. In a less inclined position, only a smaller amount of liquid will be dispensed, and it will not be properly metered.

Accordingly, the embodiment in FIG. 3—where like reference numerals again identify like components as before 13 provides an insert member 20 which closes the upper open end of the outer tube 3 and extends across the cross section of the chamber 1b. This insert member 20 is formed with an annular channel 7 which extends along the inner side of the housing concentric with the latter. It communicates at 4' with the upper end of the outer tube 3, and at 20a with a compartment 8 into which the space between the upper end of the housing and the insert member 20 is subdivided by a flexible diaphragm 21 which is mounted in this space on the housing. A plurality of tubees 9 communicate with the channel 7, extending vertically in the chamber 1b and having lower open ends located closely adjacent to but spaced from the bottom wall 1a.

Assuming that the device of FIG. 3 is not held in the vertical position which is illustrated, but is inclinned to the horizontal at a lesser extent, then liquid will flow via the tubes 9 into the channel 7 before the liquid which rises in the chamber 1b can reach the upper open end 2" of the tube 2. This blocks the outflow of air via the compartment 8 and the air tube 4 into the bottle 5, and thus effectively blocks a further flow of liquid from the bottle 5 into the chamber 1b.

It is desirable that the device according to the present invention be combined with a counting arrangement which counts the number of metered quantities of liquid which has been dispensed. Such an arrangement can, for example, be embodied as follows:

If the bottle is inclined and air flows via the tube 4 into the bottle 5 (see FIG. 1), then there will be either no suction in the bottle 5 or at most a slight one. This is the case when the chamber 1b is filled with liquid via the tube 6. As soon as the dispensing of liquid via the tube 2 begins, the supply of air via the tube 4 into the bottle 5 is terminated, and maximum suction now exists in the bottle 5. In other words, the suction varies alternately between a maximum suction and a minimum suction or no suction. This varying suction can be used to act upon a diaphragm which is flexed and causes a counting pulse to be triggered.

Another way in which the desired result can be achieved is to use the hydrostatic underpressure which develops in the region 4' (see FIG 3) and which is communicated via the channel 7 at the opening 20 into the compartment 8. When the tube 2 is empty and liquid flows via the tube 6 into the chamber 1b, then no underpressure exists in the region 4' and in the compartment 8. However, as soon as the dispensing of liquid begins, an increasing underpressure will develop in the region 4' and be communicated to the compartment 8. The maximum degree of this underpressure is determined by the level difference between the upper end 2" and the lower end 3'. It is sufficient to cause a flexing of the diaphragm 21 in downward direction, and thus to trigger a counting pulse via the rod or pin that will be seen in FIG. 3 to be connected with the diaphragm 21 and to extend outwardly of the housing.

This is a mechanical pulse which can be supplied directly to a step-type counter that can be viewed via an appropriately provided window and indicates the number of quantities of liquid which have been dispensed.

However, the mechanical pulse can also be converted into an acoustical signal or an electromagnetic signal, and can act upon a registering device which may be part of the dispensing deevice, that is being mounted on it, or which may be located separately from it. In many instances it is particularly advantageous if the registering device indicates not the amount of liquid that has been dispensed, but directly indicates the value of the amount of liquid that has been dispensed. This can be done by causing the mechanical impulse to effect a longitudinal displacement or an angular displacement of an appropriate device, with successive displacements being added. To indicate the value of the amounts of liquid which have been dispensed, a registering device can be coupled with the dispenser and provided with a counter, and the counter may count back from a value corresponding to the total value of liquid in the bottle and other container to zero. This means that when all the liquid has been dispensed from the bottle, the counter will indicate zero, and anywhere in between it will indicate the value of the liquid still remaining in the bottle. Of course, it is also possible to have the counter indicate directly the value of liquid that has already been dispensed.

An arrangement which can be used for this purpose may utilize a spring device which before the dispenser is put into operation has been tensioned to any extent indicative of the total contents of the bottle with which the dispenser is to be used. The mechanical pulse which originates during the dispensing of each metered quantity of liquid, can then be used to relax the spring device by one step, for instance via one rotation of an associated shaft. Assuming that the monetary value of each dispensed metered quantity of liquid is e.g., $1.30, then the device will be provided with a replaceable small transmission having a transmission ratio of, in this case, 1 : 13. Each rotation of the shaft is applied to the transmission. If, for instance, 10 metered quantities have been dispensed, then the shaft will have performed 10 rotations corresponding to 10 successive relaxation steps of the spring device. The output shaft of the transmission, however, will have performed 130 rotations, indicative of a monetary value of $13. It order to indicate this monetary value a registration device is provided which may use a small battery-operated electromotor having a shaft on which a rotation counter is provided. The shaft is coupled with the output of the transmission. In order to tension the spring again to its former condition, the shaft of the electromotor when energized has to perform 130 rotations which are counted by the rotation counter, so that the latter then indicates a total monetary value of $13. Since different ones of the transmissions can be employed, one being replaced with another one having a different transmission ratio, different monetary values of metered quantities of liquid can readily be selected. This means that many different containers having liquids which are worth different monetary values par dispensed quantity, can be utilized with the dispenser according to the present invention. The total amount (in terms of monetary value) of the dispensed metered quantities of liquid for all bottles with which the dispenser has been used, will appear in form of a total value and be readily avialable.

It will be understood that each of the elements described above, or two or more together, may also find a useful application in other types of constructions differing from the type described above.

While the invention has been illustrated and described as embodied in a dispenser, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A dispenser for dispensing metered quantities of liquid from a container, comprising a housing forming a chamber and having a bottom wall; a discharge tube communicating with said chamber in the region of said bottom wall and having a free end which is spaced from said housing and insertable into a discharge opening of the container; a dispensing tube extending through said bottom wall and including a portion located centrally within said chamber and having an open upper end; an outer tube surrounding said portion of said dispensing tube with clearance and having an open lower end portion communicating with said chamber at said bottom wall, and a closed upper end portion located upwardly of said open end of said dispensing tube and bounding an interior space in communication with said clearance and with said dispensing tube, the distance between said lower open end portion of said outer tube and said open upper end of said dispensing tube being determinative of the metered quantity of liquid dispensed from the container; insert means including an insert member accommodated in said closed upper end portion and subdividing said interior space thereof into an upper air compartment and a lower liquid compartment; passage means for passage of air through said insert means and including at least one opening in said insert member communicating said lower liquid compartment with said upper air compartment; means for replacing the liquid dispensed from the container by air and including an air tube communicating said air compartment with the container; and air vent means communicating said chamber with the exterior of said housing for admitting replacement air into said chamber.

2. A dispenser as defined in claim 1, said insert member having a lower side facing into said lower liquid compartment and configurated for guiding liquid from said clearance into said upper open end.

3. A dispenser as defined in claim 2, wherein said insert member has a disc-shaped portion which fills the inner cross section of said outer tube and is provided with said passage means which communicates with said compartments, and wiith a projection extending from said disc-shaped portion into said upper open end and merging into said disc-shaped portion via a circumferentially extending concave surface which guides said liquid into said upper open end.

4. A dispenser for dispensing metered quantities of liquid from a container, comprising a housing forming a chamber which has a bottom wall; a discharge tube communicating with said chamber in the region of said bottom wall and being upwardly inclined, said discharge tube having a free end which is insertable into a dispensing opening of the container; a dispensing tube extending through said bottom wall and having a portion located centrally within said chamber and provided with an upper open end having a free upper edge; an outer tube surrounding said portion of said dispensing tube with clearance and having an upper end portion provided with a closed upper end located upwardly of said upper open end of said dispensing tube; an air tube communicating with the interior of said outer tube at said upper end portion, and with the interior of said discharge tube; insert means in said chamber in the region of said upper end portion and operative for so guiding liquid, which rises in said clearance to said upper open end, into said open upper end that the cross section of the latter is completely filled with such liquid, said insert means comprising an insert member accommodated in said upper end portion and subdividing the space between said upper edge and said closed upper end into an upper air compartment and a lower liquid compartment which communicates with said clearance and with said dispensing tube, said insert member having a lower side facing into said lower liquid compartment and configurated for guiding liquid from said clearance into said upper open end, said insert member further having a disc-shaped portion which fills the inner cross section of said outer tube, and a projection extending from said disc-shaped portion into said upper open end and merging into said disc-shaped portion via a circumferentially extending concave surface which guides said liquid into said upper open end; passage means for passage of air through said insert means from said chamber into said air tube, said passage means being provided in said disc-shaped portion of said insert member and communicating with said compartments; and air vent means communicating said chamber with the exterior of said housing for admitting replacement air into said chamber.

* * * * *